(12) United States Patent
Traeger

(10) Patent No.: US 9,930,991 B2
(45) Date of Patent: Apr. 3, 2018

(54) CUSTOMIZED GRILL LID SYSTEM

(71) Applicant: Q LIDS, LLC, Sherwood, OR (US)

(72) Inventor: Patrick Traeger, Scio, OR (US)

(73) Assignee: Q LIDS, LLC, Sherwood, OR (US)

( * ) Notice: Subject to any disclaimer, the term of this patent is extended or adjusted under 35 U.S.C. 154(b) by 490 days.

(21) Appl. No.: 14/552,171

(22) Filed: Nov. 24, 2014

(65) Prior Publication Data

US 2015/0144238 A1 May 28, 2015

Related U.S. Application Data

(60) Provisional application No. 61/908,488, filed on Nov. 25, 2013.

(51) Int. Cl.
*A47J 37/10* (2006.01)
*A47J 37/07* (2006.01)
*F24C 15/10* (2006.01)

(52) U.S. Cl.
CPC ............ *A47J 37/0786* (2013.01); *A47J 37/10* (2013.01); *F24C 15/10* (2013.01)

(58) Field of Classification Search
CPC ............ A47J 37/07; A47J 37/10; F24C 15/10
USPC ................ 126/220, 25 R, 41 R, 30; 428/131
See application file for complete search history.

(56) References Cited

U.S. PATENT DOCUMENTS

| | | | | |
|---|---|---|---|---|
| 3,490,123 | A * | 1/1970 | Clark | F24C 15/00 126/211 |
| 4,763,639 | A * | 8/1988 | Goldsworthy | A47J 37/0704 126/25 R |
| 5,399,439 | A * | 3/1995 | Rasmussen | A47J 37/0786 126/25 R |
| 7,587,846 | B2 * | 9/2009 | Khan | G09F 7/04 232/17 |
| 2005/0045170 | A1* | 3/2005 | Lerner | A47J 37/0611 126/30 |
| 2006/0213497 | A1* | 9/2006 | Orozco | A47J 37/0786 126/41 R |
| 2012/0012093 | A1* | 1/2012 | Mishra | F24C 15/10 126/211 |

* cited by examiner

*Primary Examiner* — Gregory Huson
*Assistant Examiner* — Nikhil Mashruwala
(74) *Attorney, Agent, or Firm* — McCoy Russell LLP

(57) ABSTRACT

A customized grill lid system, including a grill lid removably coupled to a grill where an inside of the grill lid defining a grilling area below which grill racks are positioned, is described. An example system comprises an aluminum skin having a shape conforming to the grill lid and is shaped to fit over the grill lid, with a printed plastic layer positioned on an exterior of the metal skin that supports customized printing in color. A gasket may be positioned along at least part of an edge of the skin, such that the skin is a distance away from the grill lid so as to create a gap between an exterior of the grill lid and an interior side of the metal skin.

21 Claims, 16 Drawing Sheets

DETAIL A
2x

VIEW A-A
ROTATED 45° CCW

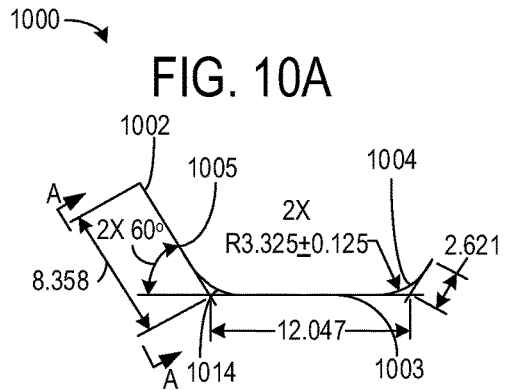
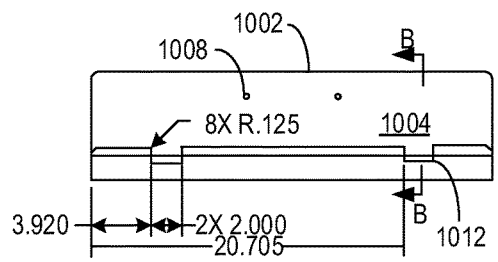
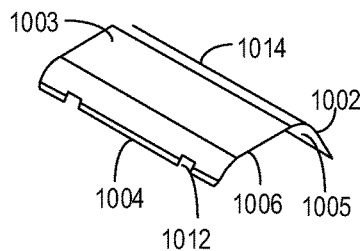
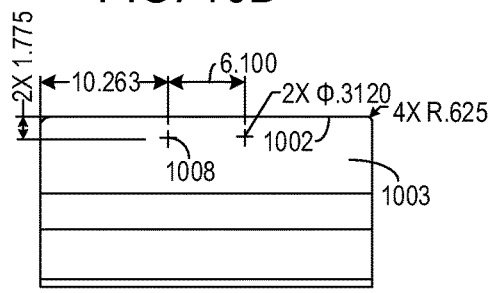
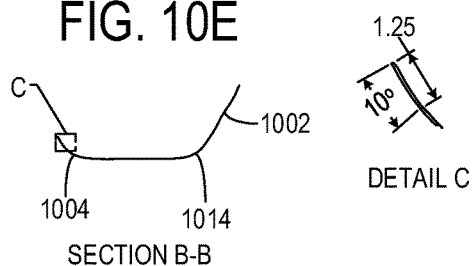
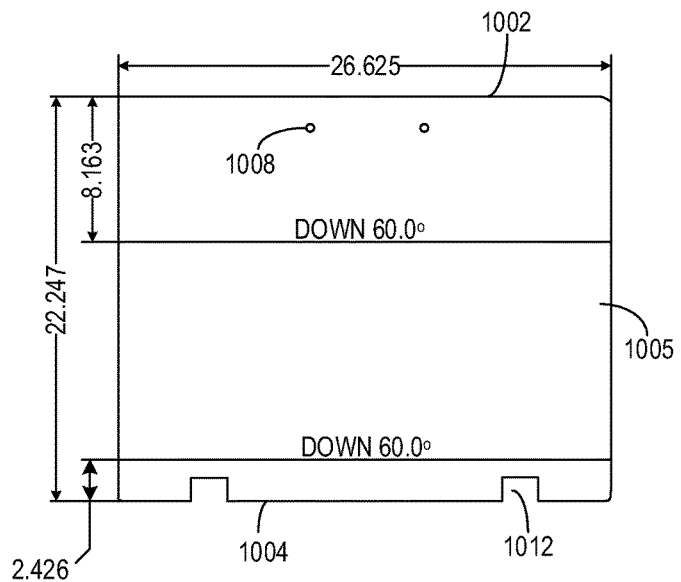

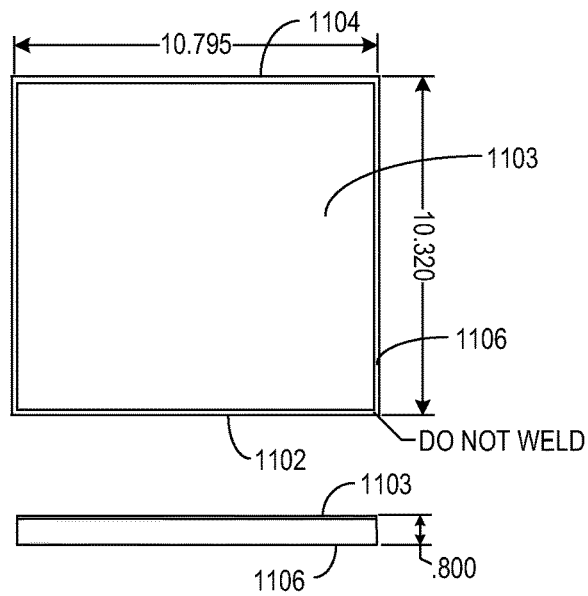
FIG. 11A
FIG. 11B
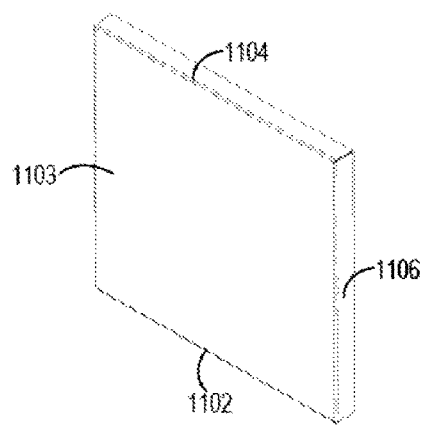
FIG. 11C
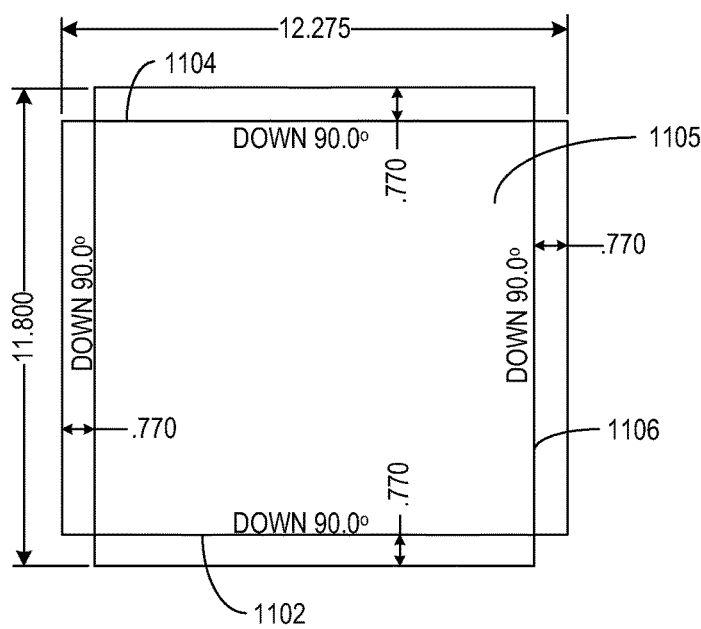

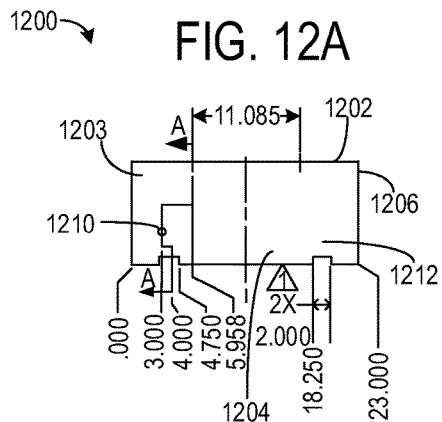
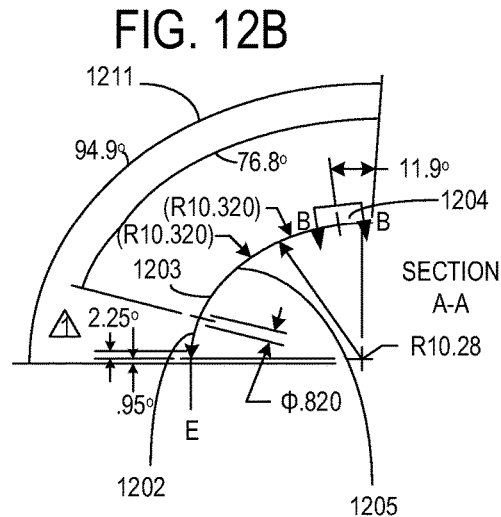
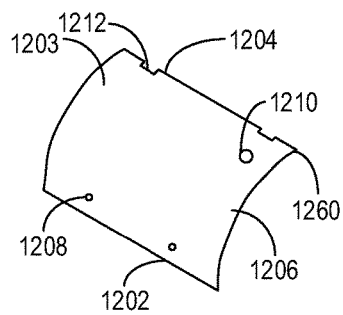
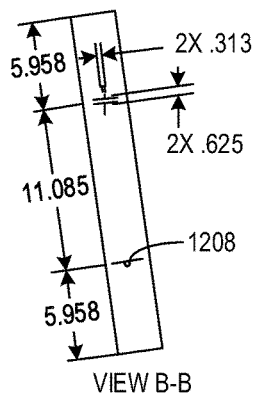
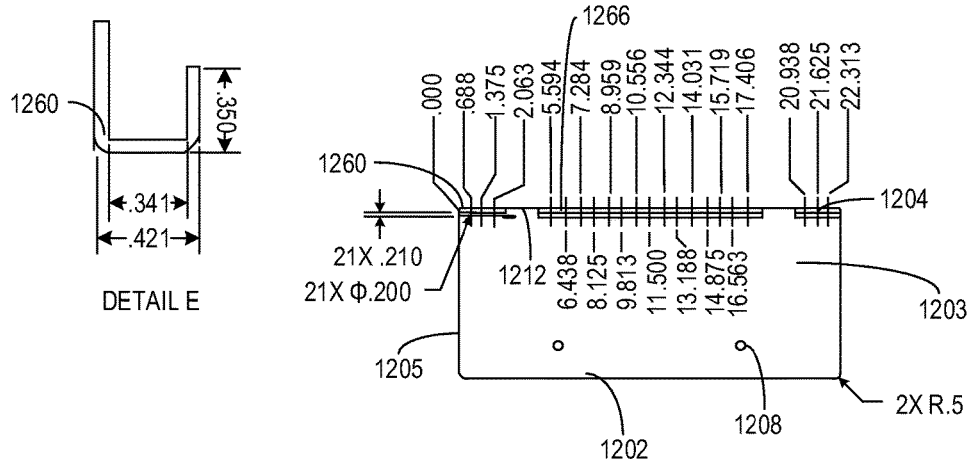

CUSTOMIZED GRILL LID SYSTEM

CROSS REFERENCE TO RELATED APPLICATIONS

The present application is a non-provisional of U.S. Patent Application 61/908,488, "CUSTOMIZED GRILL LID SYSTEM," filed on Nov. 25, 2013, the entire contents of which are hereby incorporated by reference for all purposes.

BACKGROUND AND SUMMARY

Outdoor grilling is very popular in many areas of the country. Specifically, outdoor grilling is a mainstay for special occasions, such as sporting events and parties. The art of customizing personal goods has become prevalent for many aspects of outdoor grilling including customizing barbecue tools, dinnerware, and barbecue grills. In order to achieve this level of customization for barbecue grills, paint and/or vinyl applications (e.g. high temperature paint and vinyl stickers) have been known to be applied to the respective surfaces of the barbecue grill, such as a barbecue lid (e.g. sport team logos, custom color designs, quotations, etc.).

The inventors have recognized a problem with applying paint and/or vinyl custom applications to a barbecue grill lid. Due to the high temperatures of the barbecue grill and the grill lid during the cooking process, paint and/or vinyl custom applications become temporary. For example, cooking results in sustained high temperatures of the barbecue grill and grill lid which may cause the paint and/or vinyl to melt, peel, or otherwise degrade. Further, paint and vinyl custom applications applied directly to the barbecue grill lid may cause permanent damage to the respective grill surfaces. For example, applying custom designs directly to the barbecue grill lid may result in damage and/or removal of the barbecue grill lid's protective coating, thereby resulting in the grill lid rusting. Further, such approaches may be time intensive and costly.

In one example, some of the above issues may be addressed by a customized barbecue grill cover comprising, a skin having a shape conforming to a grill lid and shaped to fit over the grill lid, a printed layer positioned on an exterior of the metal. Further, the skin and grill lid are attached using a gasket positioned along at least part of an edge of the skin, the gasket including a recess fittable over and removably connectable with the lid. The gasket is positioned such that the skin is a set distance away from the grill lid so as to create a gap between an exterior of the grill lid and an interior side of the metal skin. The gap created by the gasket positioning may be filled with insulation and/or may be open space that allows air to circulate between the skin and lid such that the high temperatures radiating from the barbecue grill are cooled before reaching the skin layer. Additionally, or alternatively, the grill skin may feature a bend, such as a 180 degree bend, that hooks over the grill lid so as to removably fasten the customized skin on to the grill lid. Further, the bend may have a group of apertures distributed on its surface that provides ventilation in the air gap created by the gasket.

In addition, the gasket may be fittable over and removably connectable with the lid. For example, the skin may be attached to the grill with a removable gasket, allowing for a plurality of customized skins to be interchangeable to one grill lid. Therefore, the gasket firstly enables insulation or air circulation between the skin and the grill lid such that the skin does not acquire the high temperatures of the grill, thereby avoiding temperature-induced damage. Secondly, the gasket enables a removable element that makes the grill skin interchangeable, as well as customizable. In this way, the insulating elements serve dual purpose and complement the advantageous operation of the system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 10A-F show a diagram of a curved grill lid including two sections.

FIGS. 11A-C include diagrams of a square grill lid.

FIGS. 12A-H show a diagram of a curved grill lid with a 180 degree bend (hook).

FIGS. 1-12H (excluding FIG. 5A) are each drawn approximately to scale, although other relative sizing may be used, if desired.

DETAILED DESCRIPTION

Figure 1:
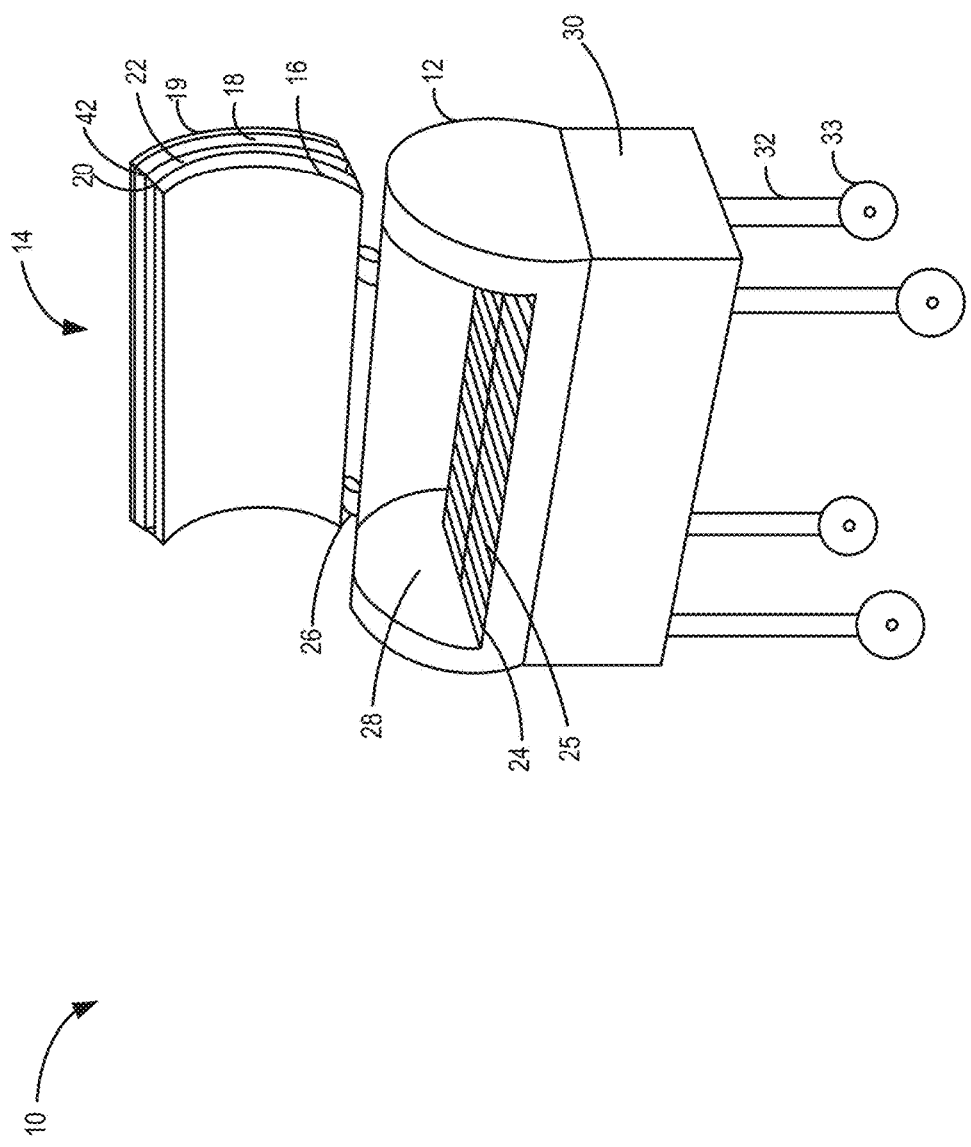
FIG. 1 shows a schematic diagram a grill system including a customized grill lid cover in the open position.
Figure 2:
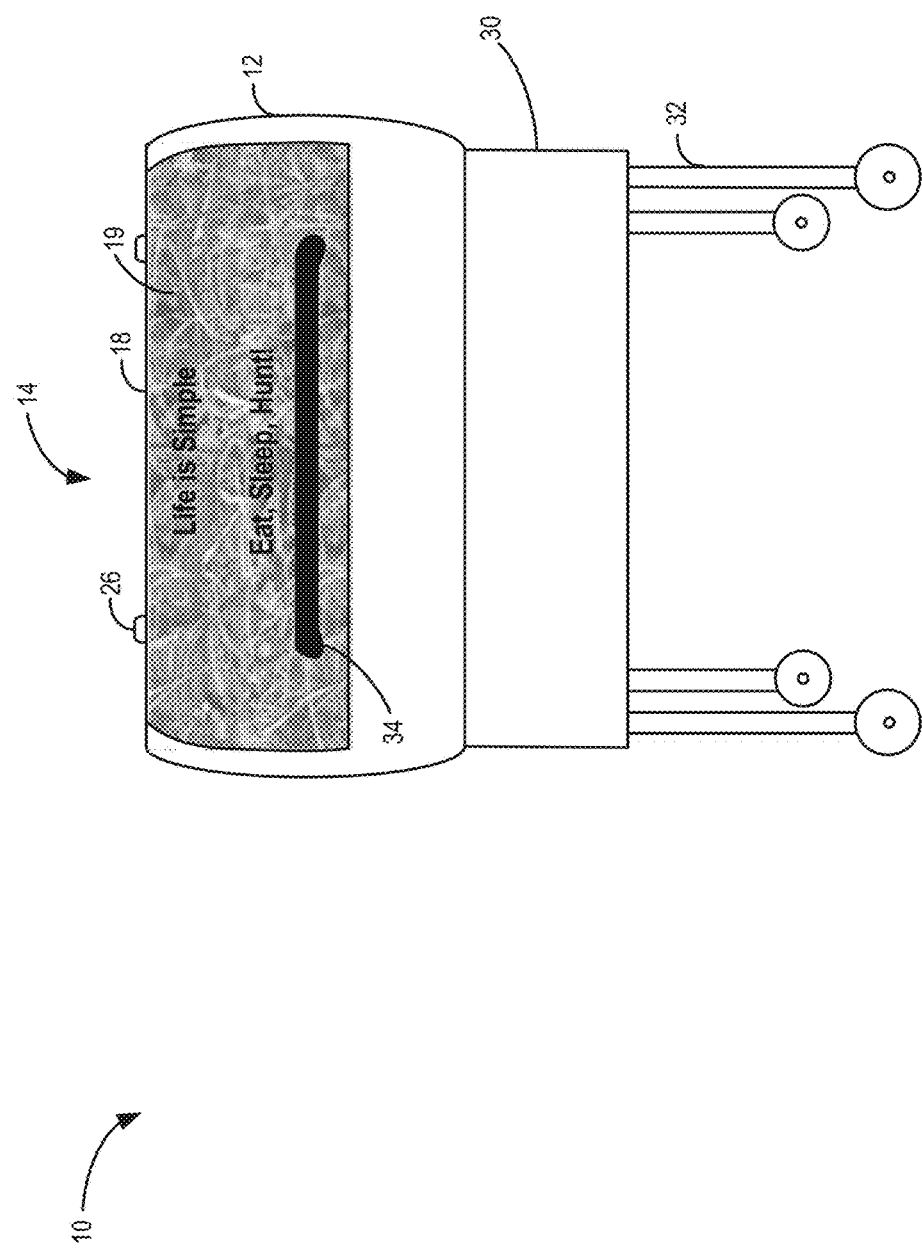
FIG. 2 shows a schematic diagram of a front view of a grill system including a customized grill lid cover in the closed position.

A system is provided for a customized grill lid cover configured to be removably coupled to a barbecue grill including a skin layer that supports customized printing (FIGS. 1-2). Additionally, a gasket is positioned on the edge of the customized grill lid cover such that the gasket is fittable and removably connected to the grill lid (FIG. 3-4A-D). Further, the skin layer may feature a 180 degree bend with ventilation apertures that hooks onto the grill lid (FIG. 5). The customized grill cover may also be customized to fit a plurality of grill lids (FIGS. 6-10). Additional details are further provided in FIGS. 11-12.

Note that while various examples are describes, such as example gaskets, alternative shapes and configurations, such as various alternative examples described herein, may be used.

Referring now to FIG. 1, a schematic diagram of a side view of a grill system including a customized grill lid cover in the open position is shown. A grill system 10 is shown with a grill body 12. Grill body 12 may be a barrel or cylindrical shape, as shown in FIG. 1, or other grill shapes. Grill body 12 includes a customized grill lid system 14 including grill lid 16 and customized grill skin 18. Further, custom grill lid system 14 is removably coupled to grill body 12 by metal fasteners 26 positioned equidistantly from each other on the exterior, rear-facing surface of grill body 12. Metal fasteners 26 are subsequently attached to custom grill lid system 14 and are positioned on the rear-facing surface of grill lid 16. Metal fasteners 26 attach custom grill lid system 14 to grill body 12 through screwing and/or bolting. In another example, customized grill skin 18 may be removably coupled to grill lid 16 by a 180 degree bend (not shown). Thus, metal fasteners 26 may still attach grill lid 16, but customized grill skin 18 may not have additional bolting due to the bend. Alternatively, customized grill skin 18 may be coupled to the grill lid by a bend and attached via metal fasteners 26.

Grill body 12 also includes an interior 28 of the grill positioned below grill lid 16. The interior 28 of the grill includes a grilling area below which grill rack 24 is positioned. Grill rack 24 includes a number of grill bar elements 25 separated by spaces and may be made of metal, where the grill elements are metal rods. Grill rack 24 may be positioned such that it extends transversely across the entire portion of the diameter of the grill body 12 and may rest on the interior surface of grill body 12 and/or be supported by an internal flange. The grill body 12 may be supported by grill support 30, including support legs 32. Grill support 30 may be rectangular and/or hollow, and positioned under grill body 12. Grill support 30 may be attached to grill body 12 through welding and/or screwing. Support legs 32 are fastened onto grill support 30 such that all the support legs are parallel to one another. Further, support legs 32 may include wheels 33.

As noted above, customized grill lid system 14 includes grill lid 16, customized grill lid skin 18, and gasket 20. The customized grill lid system 14 is removably coupled to the grill body and includes an inside of the grill lid defining a grilling area below which grill racks are positioned. Grill lid 16 may be composed of metal or another material suitable for use in high temperatures. Grill lid 16 may be a curved, cylindrical shaped lid, as shown in FIG. 1, or other shapes corresponding to the appropriate grill lid shape (e.g. square-shaped, rectangular, etc.). Customized grill skin 18 may have a shape corresponding to a grill lid 16 that is fabricated in order to fit over and conform to the grill lid. For example, grill lid 16 may be a curved grill lid (as shown in FIG. 1); thus, customized grill skin 18 would be fabricated in order to be shaped in an identical curved shape as the grill lid. Grill lid 16 is not limited to a curved, cylindrical shape and may include a plurality of grill lid shapes and sizes (see also FIGS. 6-9). Customized grill skin 18 may be composed of metal in order to withstand the high temperatures of grill system 10. In one example, the customized grill skin is made of aluminum.

Customized grill skin 18 includes a printed layer 19 positioned only on the exterior facing surface of the customized grill skin and is the outer-most layer of the customized grill lid system 14, wherein the printed plastic layer includes at least one printed object thereon visible to a grill user during grilling. In one example, printed layer 19 is made of plastic and supports customized printing in color (see also FIG. 2). For example, printed layer 19 may include sports team logos, designs, photographs, quotations, etc. Printed layer 19 may be fabricated such that the shape of the printed layer is identical to the shape of grill skin 18, wherein the printed plastic layer is in face sharing contact with the skin. For example, if the customized grill skin is a cylindrical, curved shape, the printed layer will be fabricated as a curved layer Customized grill lid system 14 includes gasket 20. In one example, gasket 20 is flexible and made of rubber (e.g. high temperature rubber). Gasket 20 adjoins both the grill lid 16 and customized grill skin 18. For example, the gasket is positioned along at least part of an edge of the grill skin, including a recess fittable over and removably connected with the grill lid. Since the grill skin is removably connected with the grill lid via a gasket, customized grill lid system 14 may be a retrofittable system for a grill. The gasket 20 is a continuous gasket and is sealed around the corners of the grill lid system in order to form multiple edges. Further, gasket 20 is shorter than a perimeter of the grill lid cover and is not positioned along the rear-facing perimeter of the grill lid and/or customized grill skin. In one example, a high temperature double sided bonding tape layer 42 (e.g. high temperature 3M™ VHB™ ½ bonding tape) is only applied to the interior surface of the customized grill skin in order to irremovably fasten gasket 20 onto the customized grill skin layer (see also FIG. 3). The high temperature double sided bonding tape layer 42 extends along the perimeter of the customized grill skin 18, including the sides and front-facing perimeters of the skin but not the rear-facing perimeter. Further, the gasket 20 also extends around some, but not all, of a perimeter of both the grill lid 16 and customized grill skin 18 such that the rear-facing perimeter does not contain gasket 20. In another example, a silicon bead layer (e.g. high temperature silicon) may be applied only to the interior surface of the customized grill skin in order to irremovably fasten gasket 20 onto the customized grill skin layer. In other embodiments, the gasket 20 may extend fully around, in an uninterrupted manner, the perimeter of the grill lid 16.

In addition, the gasket 20 may be positioned such that the customized grill skin 18 is a set distance away from the grill lid 16, so as to create gap 22 between an exterior surface of grill lid 16 and an interior surface of the customized grill skin 18 (see also FIG. 3). In one example, gap 22 is an air gap that extends laterally and depth-wise across the entire grill lid 16 and customized grill skin 18. Thus, the air gap allows air to circulate between the exterior surface of the grill lid 16 and the interior surface of the customized grill skin 18, thereby providing protection to the customized grill skin 18 from high temperatures emitted from grill body 12 and grill lid 16. In another example, gap 22 may be filled with a ceramic insulation layer (not shown). The ceramic insulation layer may be attached to the interior surface of the customized grill skin 18. By attaching a ceramic insulation layer, the customized grill lid is further protected from the high temperatures emitted from the grill body. In another example, customized grill skin 18 may feature a 180 degree bend (not shown) that may have a group of apertures distributed on its rear-facing surface. The bend featuring the apertures may be advantageous in that it may increase air ventilation in gap 22, thus providing additional (or alternative) protection to customized grill skin 18 from high temperatures emitted from grill body 12 and grill lid 16 (see FIG. 5). Thus, with this addition of the bend with ventilation apertures, gap 22 may not be filled with a ceramic insulation layer. Alternatively, a ceramic insulation layer may still fill gap 22 if desired.

FIG. 2 is a schematic diagram of a front view of a grill system including a customized grill lid cover in the closed position. A grill system 10 is shown including grill body 12, with reference to FIG. 1. In this diagram, the front view of a customized grill lid system 14 is shown displaying customized grill skin 18, specifically printed layer 19. In one example, the customized grill lid system may have specialized markings such as custom colors, designs, photographs, logos, etc. In this example, printed layer 19 of customized grill skin 18 includes a custom design including a color printed design with a quotation. Printed layer 19 has a shape conforming to the grill lid such that the printed layer fits over the customized grill lid and is positioned on the entire exterior surface of the metal customized grill skin.

The method of placing the printed layer onto the customized grill skin comprises applying the printed layer onto the metal lid cover. In order to place the printed layer onto the customized grill skin, the surface of the customized grill skin may be cleaned with a moist cloth. After the customized grill skin is dry, the printed layer (e.g. a vinyl and/or plastic layer) may be cut such that the adhesive back is ¼' larger than the customized grill skin. The protective paper on the adhesive side of the printed layer is removed and applied to the customized grill skin with the ¼' over hang on all sides of the customized grill skin. A plastic squeegee may be used to remove all the air bubbles and adhere the printed layer to the customized grill skin. In one example, a user may make firm strokes with the plastic squeegee starting at the center of the custom grill skin and moving towards the outer edges. Once the printed layer is attached to the customized grill skin, the excess printed layer is trimmed from the edges so the printed layer may be even with the edge of the customized grill skin.

Customized grill lid system 14 includes a grill handle 34 attached to the lid with bolts. In one example, a grill lid (not shown) is fixedly coupled to the customized grill skin via bolts through a handle of the lid. In one example, grill lid system 14 is attached to grill body 12 by metal fasteners 26 positioned equidistantly from each other on the exterior of grill body 12. Metal fasteners 26 are subsequently attached to grill lid system 14 and are positioned on the rear-facing surface of grill lid 16. In another example, the customized grill skin may be coupled to the grill lid by a 180 degree bend, thus the grill skin may not be attached to the metal fasteners directly, but as a coupled unit with grill lid 16. Alternatively, the customized grill skin may feature a 180 degree bend coupled to the grill lid 16 and may be directed attached via metal fasteners 26.

Figure 3A:
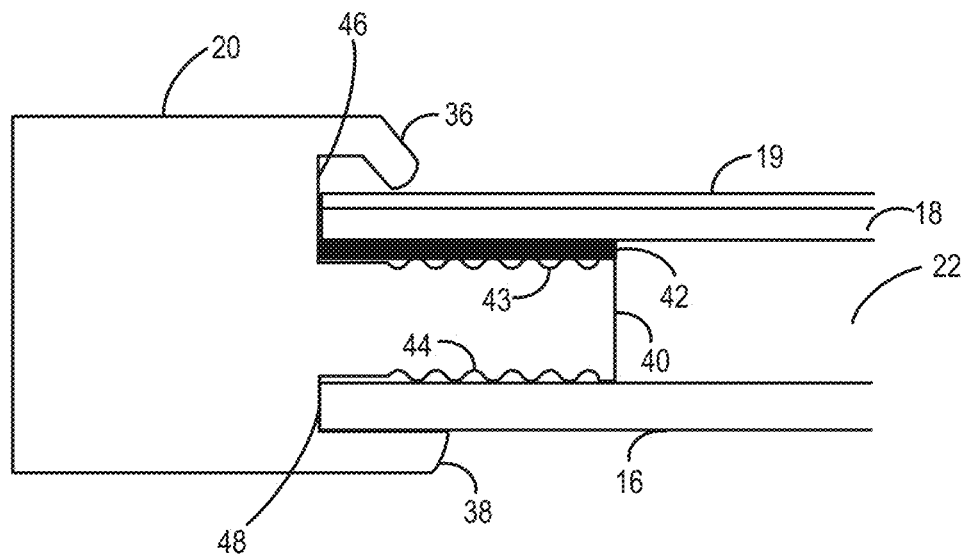
FIGS. 3A-B show a schematic diagram partial view of a gasket positioned on a grill lid including a customized grill lid cover.

Now referring to FIG. 3, a schematic diagram of a partial view of a gasket positioned on a grill lid including a customized grill skin is shown. FIG. 3A shows a side view of a gasket positioned on a customized grill lid system. Gasket 20 includes a rounded flange 36, straight flange 38, and flange 40 which includes semi-circular grooves 43 and 44. Rounded flange 36 and straight flange 38 are positioned on the exterior edges of gasket 20, whereas flange 40 is located between rounded flange 36 and straight flange 38. Rounded flange 36 and straight flange 38 are positioned a set distance away from flange 40 in order to form a recess between the respective outer flange(s). Flange 40 includes only 12 semicircular grooves such that 6 semi-circular grooves 43 are positioned facing the rounded flange and 6 semi-circular grooves 44 are positioned facing the straight flange 38.

Gasket 20 is fastened onto customized grill skin 18, including printed layer 19, such that the interior surface of customized grill skin 18 may be contiguous with flange 40 and semi-circular grooves 43. In addition, the exterior surface of customized grill skin, including printed layer 19, is positioned in recess 46 such that the customized grill skin may be contiguous with rounded flange 36. In order to fasten the gasket 20 to customized grill skin 18, a high temperature double sided bonding tape layer 42 is placed only on the interior surface of customized grill skin 18. For example, one side of the high temperature double sided bonding tape layer may be applied to the interior surface of the customized grill skin. Once applied to the customized grill lid, the gasket may be applied to the second side of the high temperature double sided bonding tape layer. In an additional example, the gasket may be applied to the high temperature double sided bonding tape layer such that only the semi-circular grooves 43 of flange 40 contact the high temperature double sided bonding tape layer 42. In this way, the customized grill 18 skin may be positioned in recess 46 and contiguous with rounded flange 36.

Additionally, gasket 20 is fastened onto grill lid 16 such that the gasket, including a recess, is fittable over and removably coupled to the grill lid. For example, grill lid 16 is positioned in recess 48. Further, the exterior surface of grill lid 16 may be contiguous with semi-circular grooves 44 of flange 40, whereas the interior surface of grill lid 16 may be contiguous with straight flange 38. However, there is not a high temperature double sided bonding tape and/or silicon bead layer applied to grill lid 16.

Gasket 20, specifically flange 40, is fastened onto customized grill skin 18 and grill lid 16 such that the interior surface of customized grill skin 18 is a set distance away from the exterior surface of grill lid 16, thereby creating a gap 22 between both grill lids. In one example, gap 22 may be an air gap or may include a ceramic insulation layer (not shown).

Figure 3B:
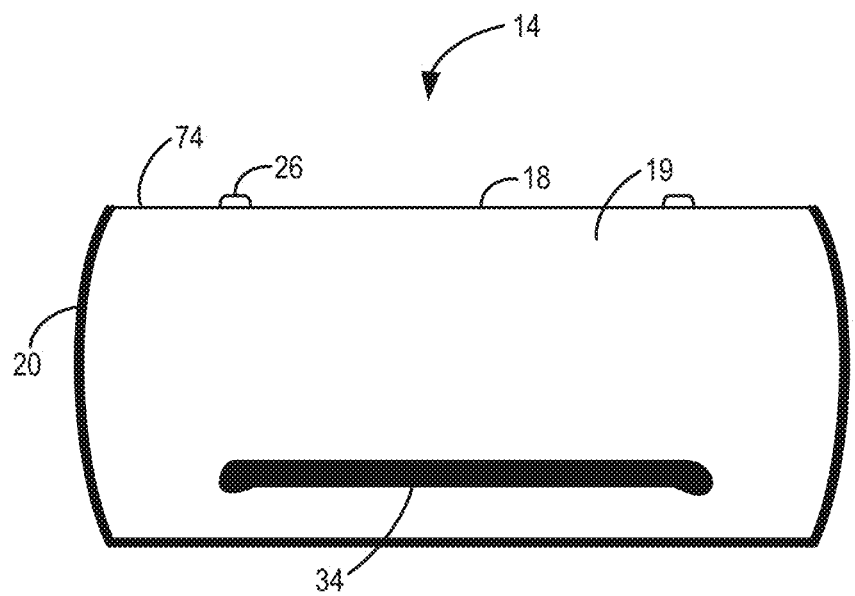
Figure 4A:
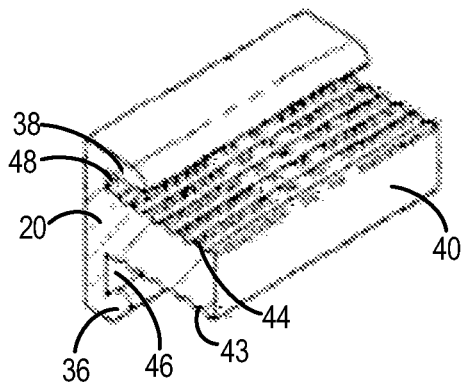
FIGS. 4A-D show a diagram of a gasket.

FIG. 3B shows a front view of a customized grill lid system including a gasket. With reference to FIGS. 2-3, customized grill lid system 14 includes a customized grill skin 18 and printed layer 19. The customized grill system also includes a flexible gasket 20 that is shorter than a perimeter of the grill lid cover and is irremovably positioned along only a part of an edge of the skin. In one example, gasket 20 is a continuous gasket positioned on the perimeter of the customized grill lid and sealed around multiple edges but is not positioned on rear-facing perimeter 74.

Figure 4B:
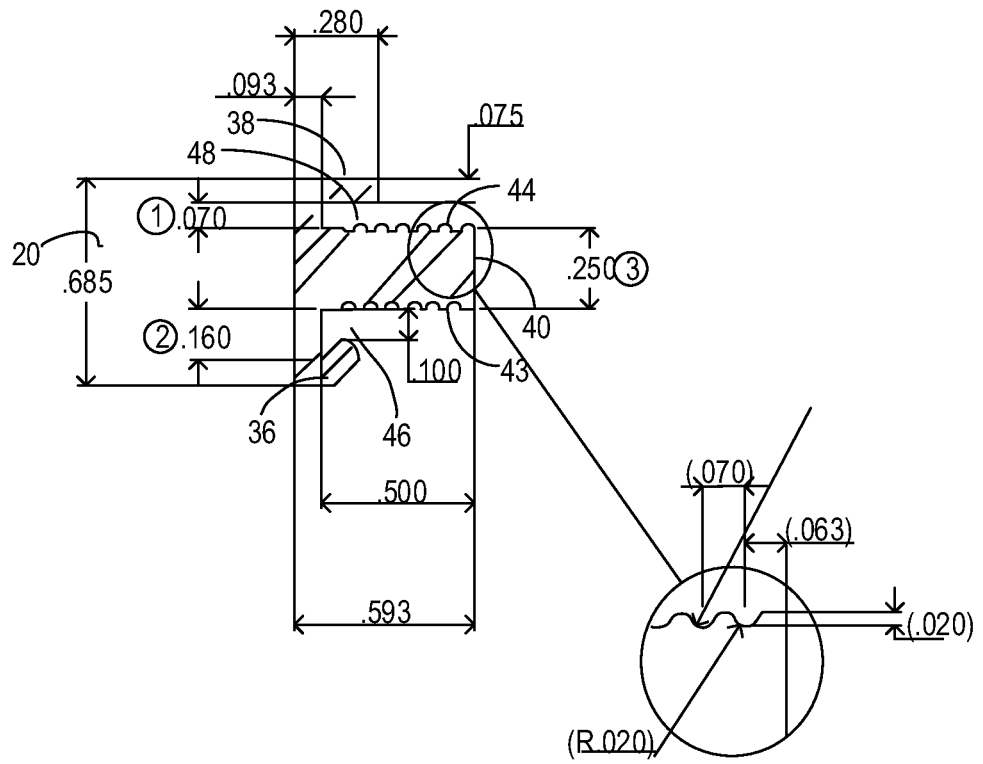

FIGS. 4A-D shows a diagram of a side view of a gasket. With reference to FIG. 3, FIG. 4A shows a gasket 20 that does not contain a customized grill cover and/or grill lid. In one example, gasket 20 is flexible and made of rubber (e.g. high temperature rubber). Gasket 20 includes a rounded flange 36, straight flange 38, and flange 40. Flange 40 is a cross-section with evenly spaced semi-circular grooves 43 and 44. Rounded flange 36 and straight flange 38 are positioned on the exterior edges of gasket 20, whereas flange 40 is located between rounded flange 36 and straight flange 38. As shown in FIG. 4B, flange 40 includes only 12 semicircular grooves such that 6 semi-circular grooves 43 are positioned facing the rounded flange and 6 semi-circular grooves 44 are positioned facing the straight flange 38. Rounded flange 36, as well as straight flange 38, are positioned a set distance away from flange 40 such that a recess 46 and a recess 48 are formed between the outer flange(s) and the inner flange. Rounded flange 36 is arranged at a greater set distance away from flange 40 as compared to the set distance of straight flange 38 from flange 40. Therefore, recess 46 may be larger than recess 48 in order to accommodate both the silicon bead layer and the customized grill lid.

Figure 4C:
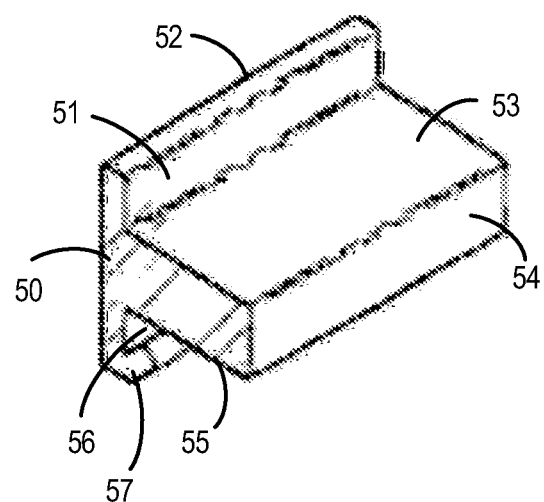
Figure 4D:
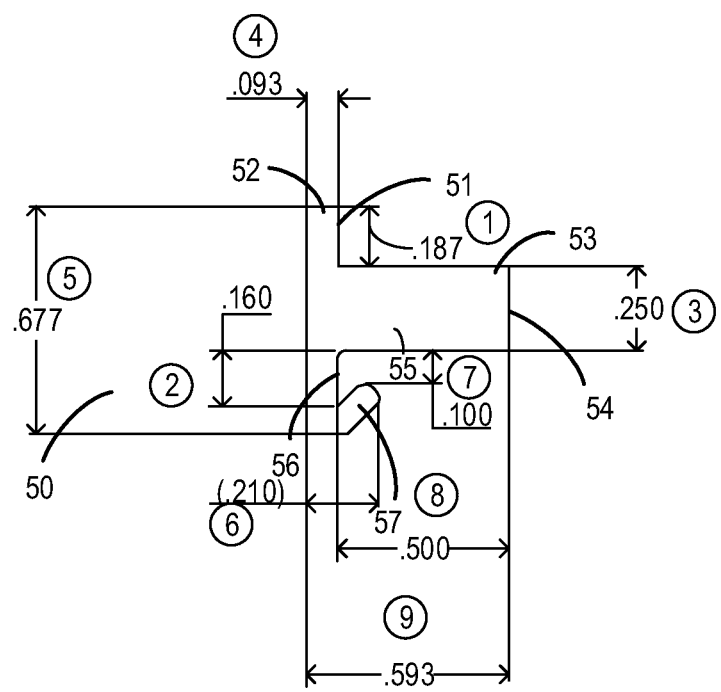

In another example, FIGS. 4C-D shows a diagram of a side view of a gasket. With reference to FIGS. 3-4B, FIGS. 4C-D shows a gasket 20 that does not contain a customized grill cover and/or grill lid. In one example, gasket 50 may be flexible and made of rubber (e.g. high temperature rubber). Gasket 50 includes a rounded flange 57, straight flange 52, and flange 54. Flange 54 is a cross-section with a top edge 53 and bottom edge 55. As such, top edge 53 and bottom edge 55 may be flat and may not contain grooves, protrusions, or indentations. Rounded flange 57 and straight flange 52 are positioned on the exterior edges of gasket 20, whereas flange 54 may be located between rounded flange 57 and straight flange 52. As shown in FIG. 4D, flange 54 includes only a flat surface and does not contain semicircular grooves. In one example, such that bottom edge 55 may be positioned facing the rounded flange and top edge 53 may be positioned facing the straight flange 52. Rounded flange 57, as well as straight flange 52, are positioned a set distance away from flange 54 such that a recess 56 and a recess 51 are formed between the outer flange(s) and the inner flange. Rounded flange 57 may be arranged at a greater set distance away from flange 54 as compared to the set distance of straight flange 52 from flange 54. Therefore, recess 56 may be larger than recess 51 in order to accommodate both the silicon bead layer and the customized grill lid.

Figure 5A:
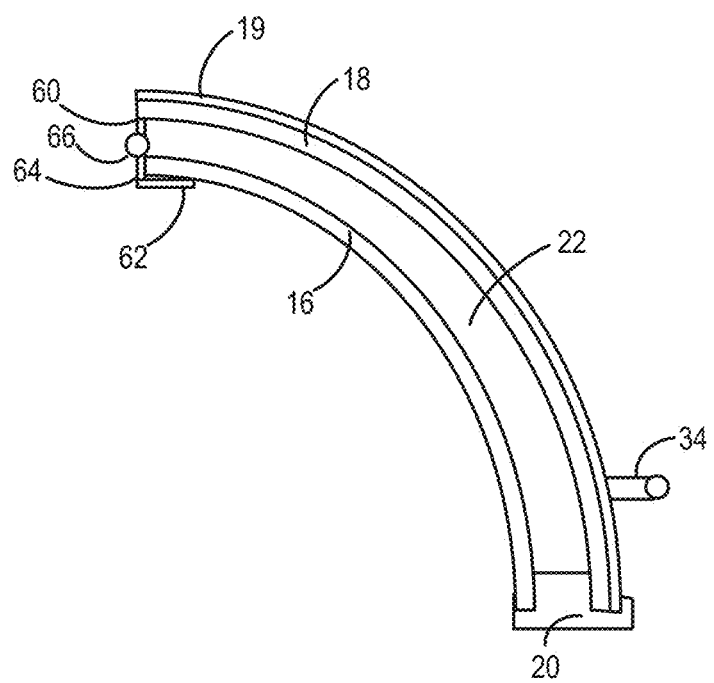
FIGS. 5A-B show a schematic diagram of a 180 degree bend positioned on a grill lid including a customized grill lid cover.
Figure 5B:
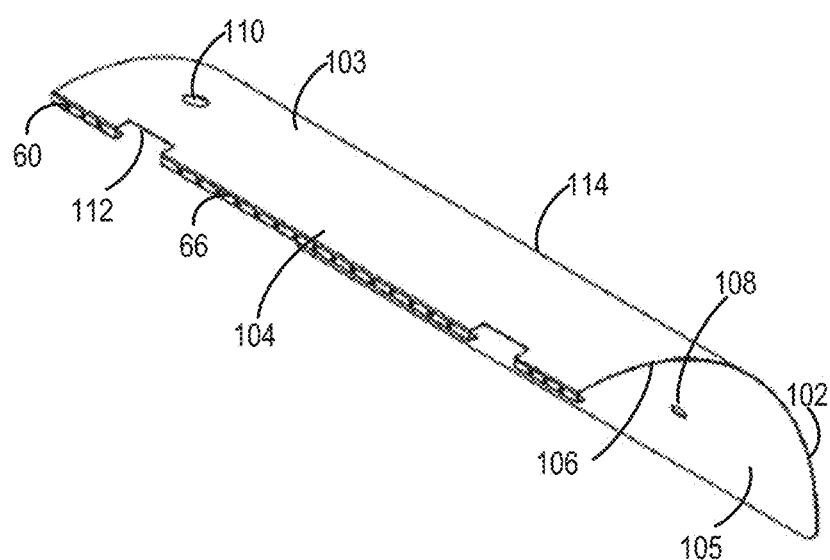
Figure 6A:
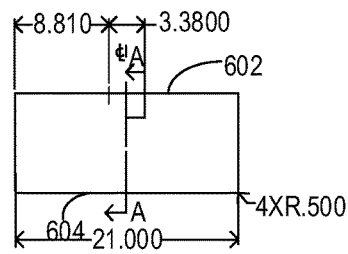
FIGS. 6A-F show a diagram of a curved grill lid.
Figure 6B:
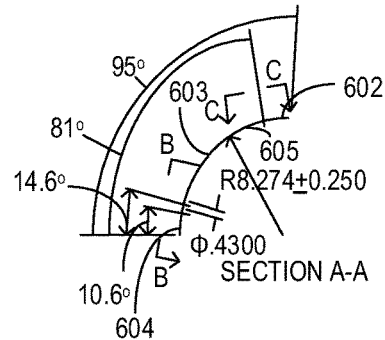
Figure 6C:
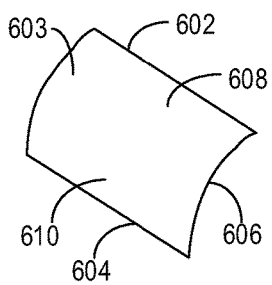
Figure 6D:
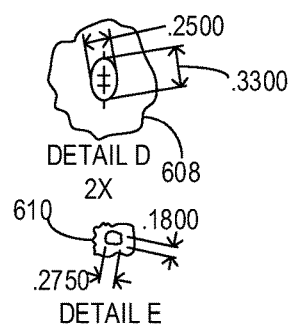
Figure 6E:
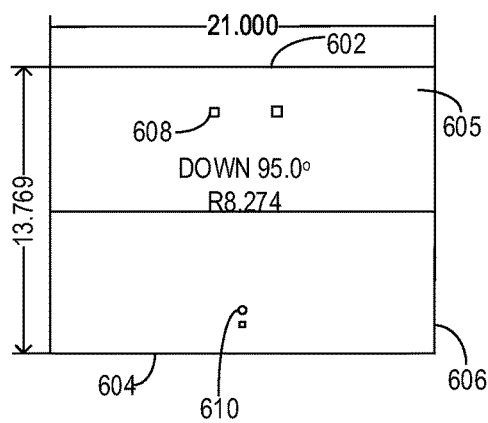
Figure 6F:
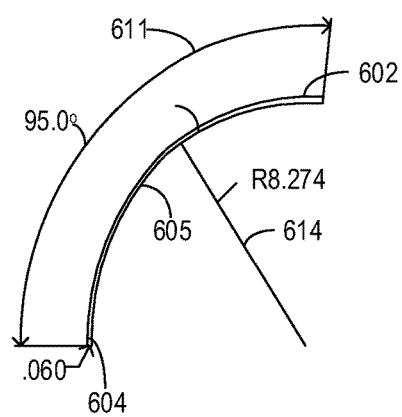
Figure 7A:
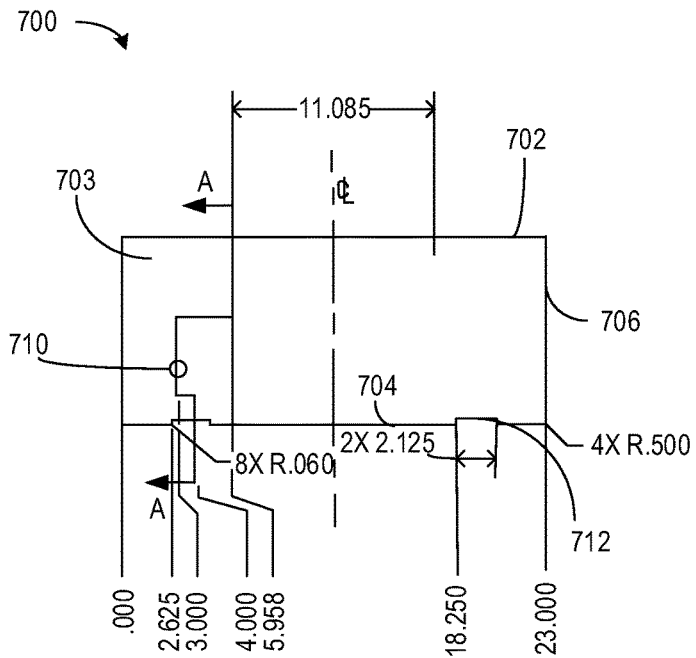
FIGS. 7A-E show a diagram of a curved grill lid.
Figure 7B:
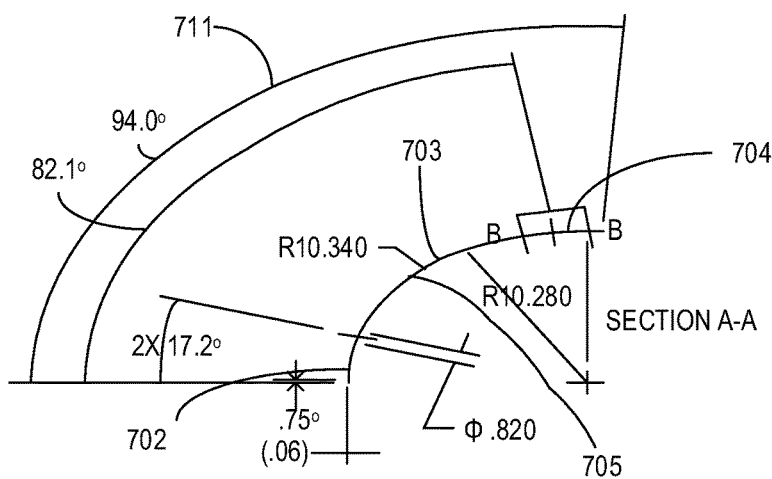
Figure 7C:
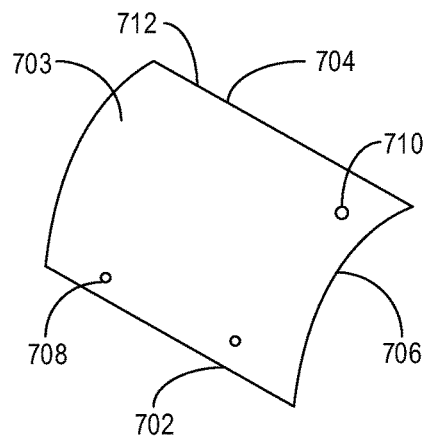
Figure 7D:
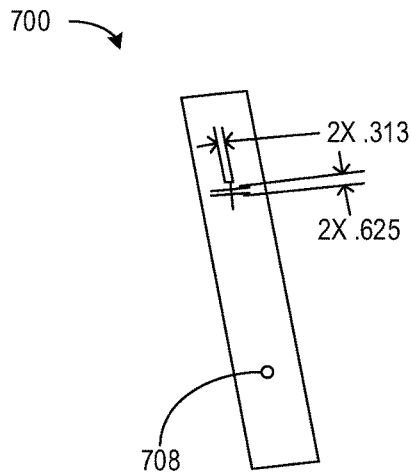
Figure 7E:
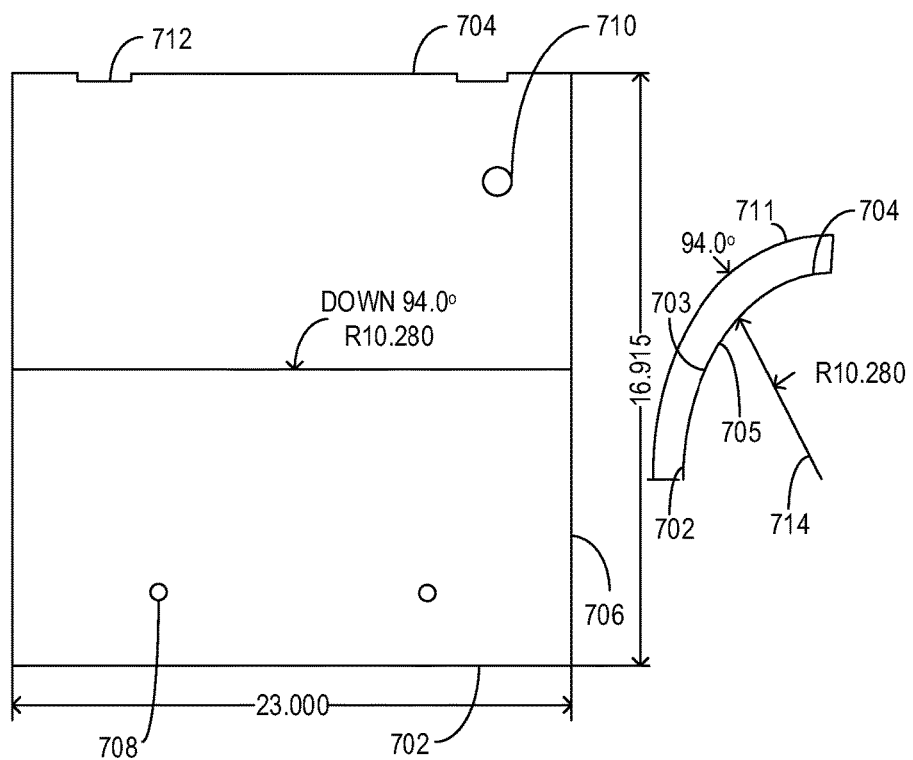
Figure 8A:
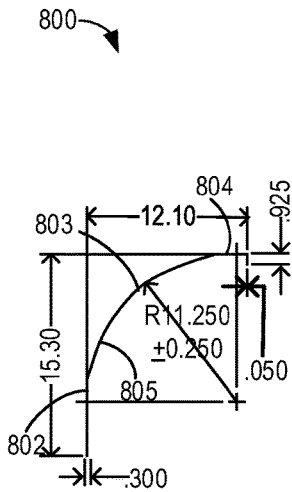
FIGS. 8A-F show a diagram of a curved grill lid.
Figure 8B:
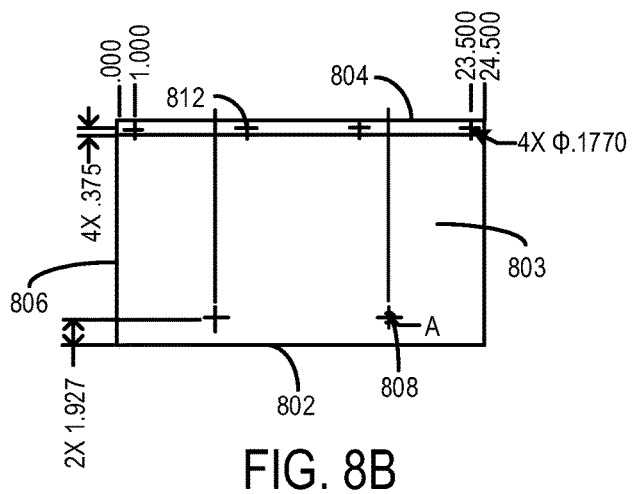
Figure 8C:
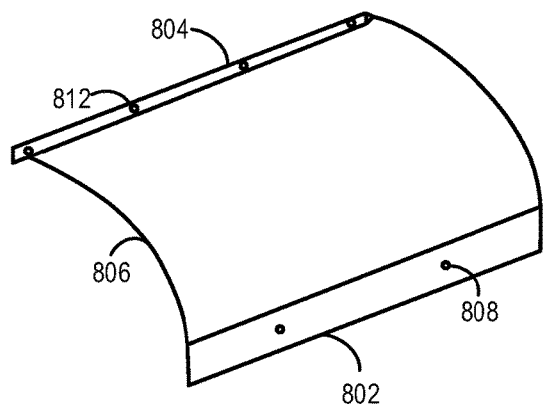
Figure 8D:
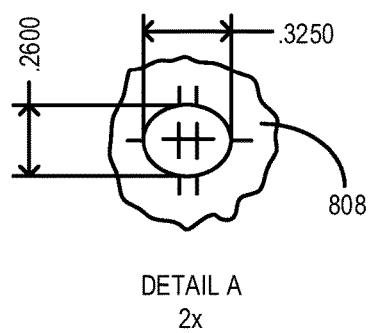
Figure 8E:
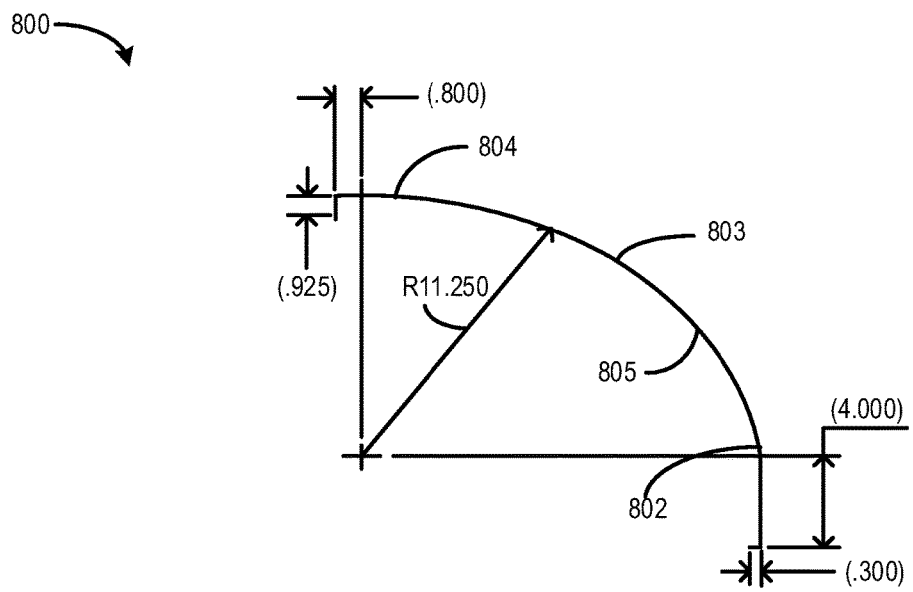
Figure 8F:
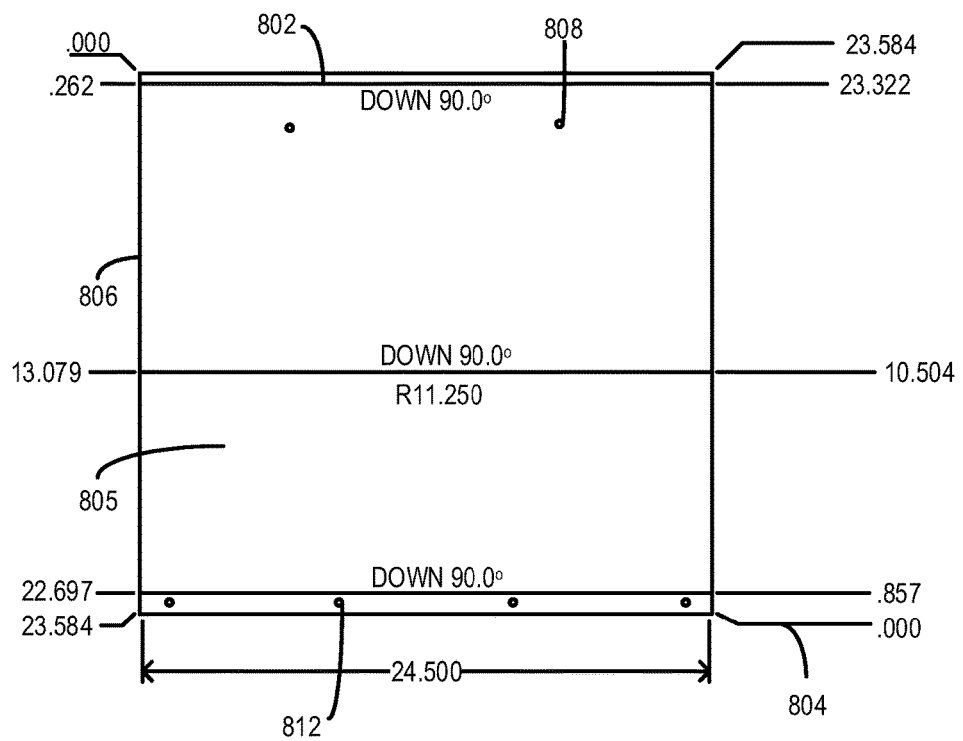
Figure 9A:
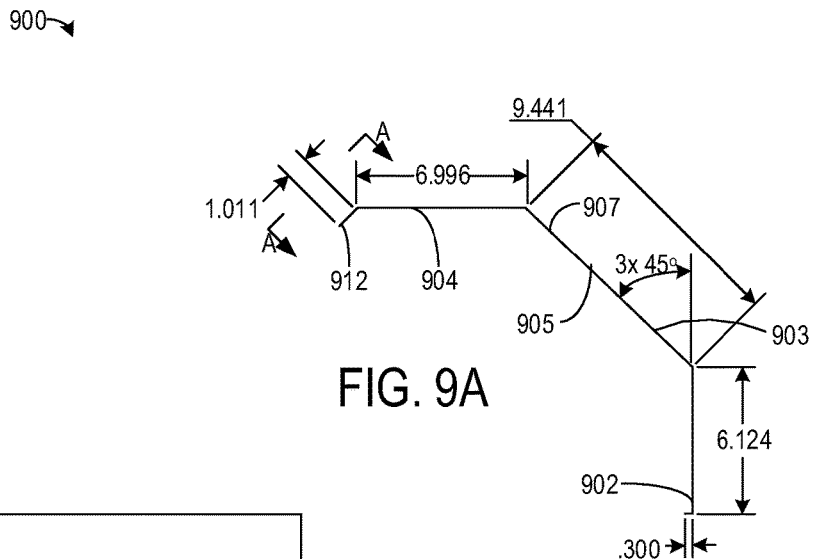
FIGS. 9A-D show a diagram of a curved grill lid including three sections.
Figure 9B:
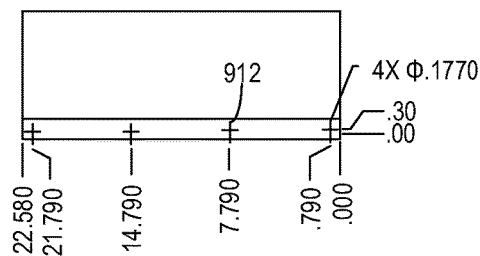
Figure 9C:
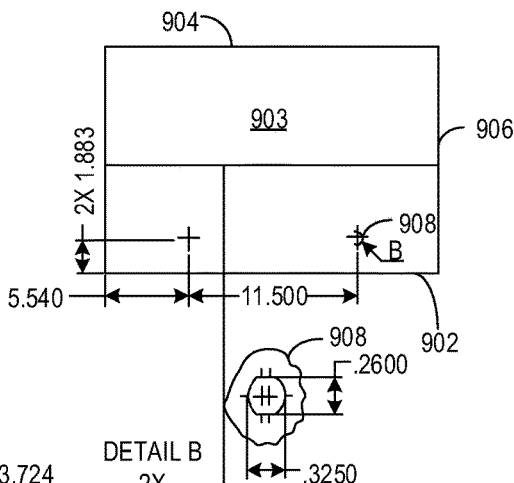
Figure 9D:
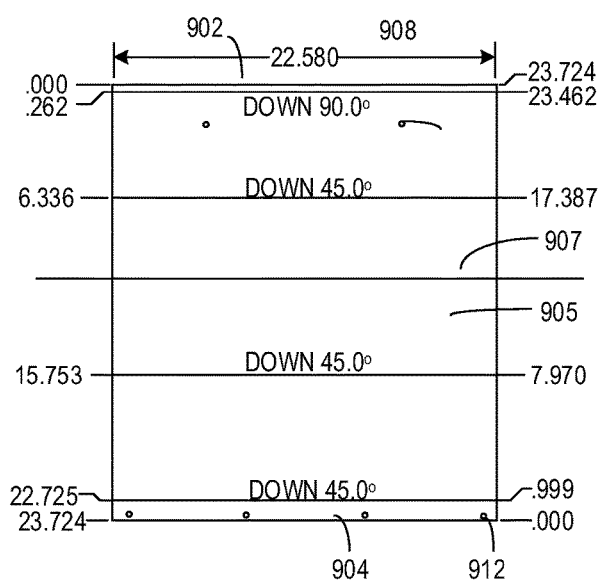

Now, referring to FIG. 5, a schematic diagram of a partial view of a 180 degree bend positioned on a grill lid including a customized grill skin is shown. FIG. 5A shows a side view of a bend 60 positioned on a customized grill lid system, with reference to FIG. 1. Bend 60 is fixedly coupled to customized grill skin 18 such that rear-facing surface 64 of bend 60 extends along perpendicularly from the rear-facing perimeter of the customized skin through gap 22. Rear-facing surface 64 of bend 60 may be perpendicularly contiguous with bottom surface 62 of the bend, which is positioned directly underneath grill lid 16. Thus surfaces 62 and 64 combine to create a hook-like structure, wherein the skin couples to the grill lid via an over-wrapping lip. This hook removably couples customized grill skin 18 and grill lid 16 as one unit with a fixed gap separating them in between. The length of surface 64 may correspond with gap 22 (created by gasket 20) and the width of grill lid 16. A group of ventilation apertures 66 are distributed on rear-facing surface 64 of the bend. FIG. 5B shows a top view of a grill lid including front-facing edge 102, rear-facing edge 104, side edge 106, exterior surface 103, and interior surface 105. In addition, rear-facing edge 104 includes areas and/or open spaces 112 to adjoin metal fasteners 26 for example. In another example, open spaces 112 create room for the metal fasteners directly joining to grill lid 16, but the fasteners may not directly adjoin to customized grill skin 18. The two sections of the grill lid (e.g. front-facing and rear-facing sections) form a curved top portion of the lid 114. Additionally, FIG. 5B shows apertures 108 for a grill handle positioned near the front-facing edge 102 and aperture 110 for a thermometer positioned near the rear-facing edge of the grill lid. Further, FIG. 5B includes 180 degree bend 60 extending along rear-facing edge 104. The bend contains apertures 66 spaced equidistantly on its rear-facing surface, effectively functioning as vent holes for the space created by gap 22, with reference to FIG. 5A. In one example, the bend may be composed of the same metal as the grill lid. Alternatively, the bend may be composed of a different metal. Further, the bend may be configured according to the shape of the grill lid and its corresponding grill skin, and thus may come in different shapes, angles, and/or curvatures than is embodied here.

FIG. 6 includes diagrams for a grill lid with a cylindrical, curved shape. FIG. 6A shows a top view of a grill lid with front-facing edge 602 and rear-facing edge 604. Rear-facing edge 604 may include metal fasteners (not shown). FIG. 6B shows a side view of a grill lid demonstrating the angle of the curve of the grill lid. With reference to FIG. 6A, the grill lid includes a front-facing edge 602 and a rear-facing edge 604. Further, FIG. 6B includes exterior surface 603 and interior surface 605. A front-facing view of a grill lid is shown in FIG. 6C including exterior surface 603 and side-edge 606. FIG. 6C also shows apertures 608 for a grill handle positioned near the front-facing edge 602 and aperture 610 for a thermometer positioned near the rear-facing edge of the grill lid. FIG. 6D shows a schematic diagram of apertures 608 and aperture 610 demonstrating the specific dimensions of the apertures. FIG. 6E shows a bottom view of a grill lid with front-facing edge 602, rear-facing edge 604, interior surface 605, apertures 608, and aperture 610. FIG. 6F shows a side view of a grill lid including the angle of the curve as well as the center 614 of the grill lid.

FIG. 7 includes diagrams for a grill lid with a cylindrical, curved shape. FIG. 7A shows a top view of a grill lid with an exterior surface 703, front-facing edge 702, rear-facing edge 704, and side edge 706. Rear-facing edge 704 may include an area 712 to adjoin metal fasteners. FIG. 7B shows a side view of a grill lid showing the angle of the curve of the grill lid 711. With reference to FIG. 7A, the grill lid includes a front-facing edge 702 and a rear-facing edge 704. Further, FIG. 7B includes exterior surface 703 and interior surface 705. A front-facing view of a grill lid is shown in FIG. 7C including exterior surface 703 and side-edge 706. FIG. 7C also shows apertures 708 for a grill handle positioned near the front-facing edge 702 and aperture 710 for a thermometer positioned near the rear-facing edge of the grill lid. FIG. 7D shows a schematic diagram of apertures 708 displaying the specific dimensions of the apertures. FIG. 7E shows a bottom view of a grill lid with front-facing edge 702, rear-facing edge 704, interior surface 705, apertures 708, and aperture 710. FIG. 7E also shows a side view of a grill lid including the angle of the curve as well as the center 714 of the grill.

FIG. 8 includes diagrams for a grill lid with a cylindrical, curved shape. FIG. 8A shows a side view of a grill lid demonstrating the specific dimensions of the grill lid. FIG. 8A includes front-facing edge 802, rear-facing edge 804, exterior surface 803, and interior surface 805. A curve is formed at the top of the lid where the front and rear-facing surfaces adjoin; however, the bottom of the front-facing surface is not curved and has a flat surface. FIG. 8B shows a top view of a grill lid with an exterior surface 803, front-facing edge 802, rear-facing edge 804, and side edge 806. In addition, the grill includes apertures 808 for a grill handle positioned near the front-facing edge 802. Further, a front-facing view of a grill lid is shown in FIG. 8C including front-facing edge 802, rear-facing edge 804, side edge 806, and apertures 808. The grill also includes apertures 812 for adjoining metal fasteners to the rear-facing edge of the grill lid. Detailed dimensions of aperture 808 are shown in FIG. 8D. FIG. 8F shows a bottom view of grill lid with front-facing edge 802, rear-facing edge 804, interior surface 805, apertures 808 and 812.

FIG. 9 includes diagrams of a grill lid that has a curved shape with three sections. FIG. 9A shows a side view of a grill lid demonstrating the specific dimensions of the grill lid. FIG. 9A includes front-facing edge 902, rear-facing edge 904, exterior surface 903, interior surface 905, and apertures 912. In addition, the grill lid contains three sections that are fabricated in order to form a curved lid. For example, the front-facing and rear-facing surfaces are adjoined at a set angle to a middle surface 907 in order to form the curved surface. Further, rear-facing edge 904 includes a curved flange that contains apertures 912. FIG. 9B is a rear view of a flange that contains apertures 912. Further, FIG. 9C shows a top view of a grill lid including front-facing edge 902, rear-facing edge 904, side edge 906, and exterior surface 903. The grill lid also includes apertures 908 for adjoining a handle near the front-facing edge 902. In addition, FIG. 9C includes a detailed diagram of the specific dimensions of apertures 908. FIG. 9D shows a bottom view of a grill lid with front-facing edge 902, rear-facing edge 904, interior surface 905, apertures 908 and 912.

FIG. 10 includes diagrams of a grill lid that has a curved shape with two sections. FIG. 10A shows a side view of a grill lid demonstrating the specific dimensions of the grill lid. FIG. 10A includes front facing edge 1002, rear-facing edge 1004, interior surface 1005, and exterior surface 1003. Rear-facing edge 1004 is shaped such that the edge forms a curved flange. The two sections of the grill lid (e.g. front-facing and rear-facing sections) are fabricated such that they form a curved top portion of the lid 1014. FIG. 10B shows a rear view of a grill lid including rear-facing edge 1004. The rear-facing edge 1004 forms a curved flange and includes areas and/or open spaces 1012 to adjoin metal fasteners. FIG. 10C shows a top view of grill lid including front-facing edge 1002, rear-facing edge 1004, side edge 1006, exterior surface 1003, and interior surface 1005. In addition, rear-facing edge 1004 includes areas and/or open spaces 1008. The two sections of the grill lid (e.g. front-facing and rear-facing sections) form a curved top portion of the lid 1014. FIG. 10D shows a front view of front-facing edge 1002 including exterior surface 1003 and apertures 1008. Further, FIG. 10E shows a detailed diagram describing the angle of the curved flange of the rear-facing edge 1004. FIG. 10F shows a bottom view of a grill lid with front-facing edge 1002, rear-facing edge 1004, interior surface 1005, apertures 1008, and areas and/or open spaces 1012.

FIG. 11 includes diagrams of a grill lid that has a square shape. FIG. 11A shows a top and side view of a grill lid demonstrating the specific dimensions of the grill lid. FIG. 11A includes front facing edge 1102, rear-facing edge 1104, and exterior surface 1103. The front-facing edge 1102, rear-facing edge 1104, and side edges 1106 are fabricated such that they form a flange. The flange may include apertures for a grill handle and/or metal fasteners (not shown). FIG. 11B shows a partial side view of a grill lid including front facing edge 1102, rear-facing edge 1104, side edge 1106, and exterior surface 1103. FIG. 11C shows a bottom view of a grill lid with facing edge 1102, rear-facing edge 1104, side edge 1106, and interior surface 1105.

Figure 12G:
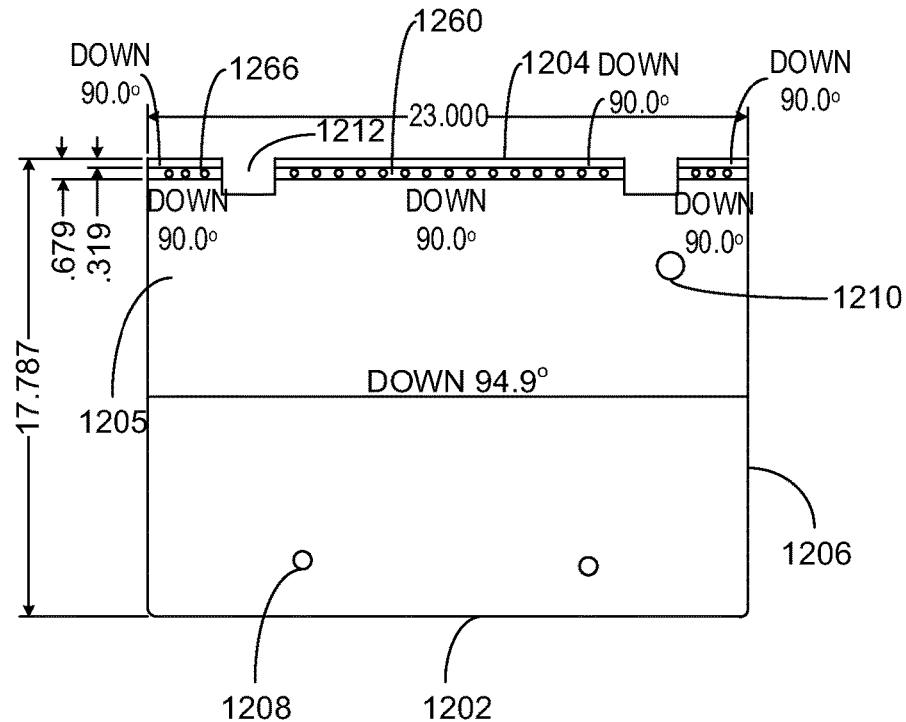
Figure 12H:
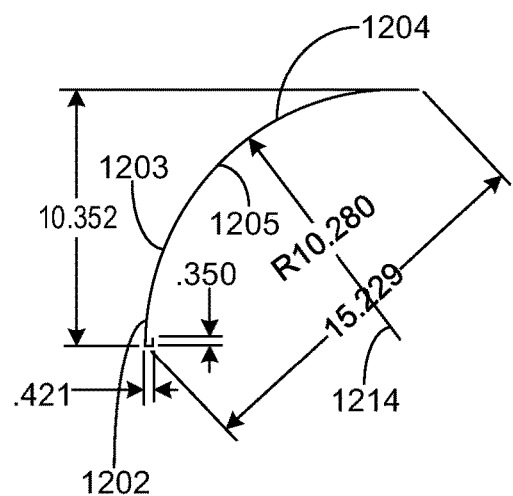

FIG. 12 includes diagrams for a grill lid with a cylindrical, curved shape and with over-wrapping lip formed via a 180 degree bend, or hook. FIG. 12A shows a top view of a grill lid with an exterior surface 1203, front-facing edge 1202, rear-facing edge 1204, and side edge 1206. Rear-facing edge 1204 may include an area 1212 to adjoin metal fasteners. FIG. 12B shows a side view of a grill lid showing the angle of the curve of the grill lid 1211. With reference to FIG. 12A, the grill lid includes a front-facing edge 1202 and a rear-facing edge 1204. Further, FIG. 12B includes exterior surface 1203 and interior surface 1205. A front-facing view of a grill lid is shown in FIG. 12C including exterior surface 1203 and side-edge 1206. FIG. 12C also shows apertures 1208 for a grill handle positioned near the front-facing edge 1202 and aperture 1210 for a thermometer positioned near the rear-facing edge of the grill lid. Further, FIG. 12C includes 180 degree bend 1260 coupled to rear-facing edge 1204. FIG. 12D shows a schematic diagram of apertures 1208 displaying the specific dimensions of the apertures. FIG. 12E shows a schematic diagram of bend 1260 displaying the specific dimensions of the bend. FIG. 12F shows a top view of a grill lid with an exterior surface 1203, front-facing edge 1202, rear-facing edge 1204, and side edge 1206. In addition, the grill includes apertures 1208 for a grill handle positioned near the front-facing edge 1202. The grill also includes apertures 1212 for adjoining metal fasteners to the rear-facing edge of the grill lid. In one example, the grill lid is directed adjoined to the grill body via the metal fasteners but the customized grill skin may not be directly adjoined. Specifically, the grill skin may be directly coupled to the grill lid via bend 1260, but not directly adjoined via metal fasteners. In another example, both grill lid and grill skin are adjoined to the grill body directly via metal fasteners. Additionally, FIG. 12F shows the distribution of ventilation apertures 1266 on a rear-facing surface of bend 1260. FIG. 12G shows a bottom view of a grill lid with front-facing edge 1202, rear-facing edge 1204, interior surface 1205, apertures 1208, and aperture 1210. In addition, FIG. 12G shows apertures 1266 distributed equidistantly on a rear-facing surface of bend 1260. FIG. 12H also shows a side view of a grill lid including the angle of the curve as well as the center 1214 of the grill.

A customized grill lid cover includes a skin, having a shape conforming to a grill lid and shaped to fit over the grill lid. In one embodiment, the grill skin is made of metal, specifically aluminum. In addition, the customized grill lid cover includes a plastic printed layer positioned on an exterior of the metal skin. In combination with the skin, the printed layer is an outer-most layer of the customized grill lid cover. In one embodiment, the customized grill lid cover also includes a gasket positioned along at least part of an edge of the skin. The gasket, which is flexible and made of rubber, includes a recess fittable over and removably connectable with the lid. Further, the gasket is fastened onto the skin by a high temperature double sided bonding tape.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A customized grill lid system comprising:
    an aluminum metal skin having a shape conforming to a grill lid and shaped to fit over the grill lid;
    a printed layer positioned on an exterior of the aluminum metal skin that supports and includes customized printing in color, the printed layer having customized printing thereon, wherein the printed layer is in face sharing contact with the aluminum metal skin; and
    a gasket positioned along at least part of an edge of the aluminum metal skin.

2. The system of claim 1, wherein the printed layer comprises a plurality of colors.

3. The system of claim 1, wherein the grill lid is fixedly coupled to the aluminum metal skin via bolts through a handle of the grill lid.

4. The system of claim 1, wherein the grill lid is configured to be removably coupled to the aluminum metal skin via a lip configured to fit over the grill lid.

5. The system of claim 1, wherein the gasket includes a recess fittable over and removably connected with the grill lid.

6. The system of claim 5, wherein the gasket is positioned such that the aluminum metal skin is positioned a distance away from the grill lid so as to create a gap between an exterior of the grill lid and an interior side of the aluminum metal skin.

7. The system of claim 1, wherein the gasket is shaped to extend around some, but not all, of a perimeter of the grill lid.

8. The system of claim 1, wherein the gasket has a cross-section with evenly spaced semi-circular grooves so that the gasket is removable from the grill lid.

9. The system of claim 6, wherein the gap between the exterior of the grill lid and the interior side of the aluminum metal skin is an air gap that extends laterally and depth-wise across an entirety of the grill lid.

10. The system of claim 6, wherein the gap is filled with a ceramic insulation layer.

11. The system of claim 4, wherein the lip includes a 180 degree bend including a plurality of apertures distributed on its rear-facing surface that provide ventilation for an air gap.

12. A retrofittable system for a grill lid, comprising includes:
a customized grill lid cover having specialized markings, the customized grill lid cover including an aluminum metal skin having a shape conforming to a grill lid, and shaped to fit over the grill lid, the markings including customized printing in face sharing contact with the aluminum metal skin; and further comprising a flexible gasket shorter than a perimeter of the grill lid cover irremovably positioned along only a part of an edge of the aluminum metal skin.

13. The system of claim 12, wherein a printed layer is positioned on an entire exterior of the aluminum metal skin.

14. The system of claim 13, wherein the gasket is positioned such that the aluminum metal skin is positioned a distance away from the grill lid so as to create a gap between an exterior of the grill lid and an interior side of the aluminum metal skin, wherein the gap between the exterior of the grill lid and the interior side of the aluminum metal skin is an air gap that extends laterally and depth-wise across the grill lid.

15. The system of claim 12, wherein the gasket includes a recess.

16. A customized grill lid system comprising:
a grill lid coupled to a grill, an inside of the grill lid defining a grilling area below which grill racks are positioned;
a skin having a shape conforming to the grill lid and shaped to fit over the grill lid;
a printed layer positioned on an exterior of the skin that supports and includes customized color printing, wherein the printed layer includes at least one printed object thereon visible to a grill user during grilling, wherein the printed layer is in face sharing contact with the skin, and wherein the skin is coupled to the grill lid, wherein the grill lid is configured to be removably coupled to the skin via a lip configured to fit over the grill lid; and
a gasket positioned along at least part of an edge of the skin.

17. The system of claim 16, wherein the skin is coupled to the grill lid via an over-wrapping lip.

18. The system of claim 16, wherein the gasket includes a recess fittable over and removably connected with the grill lid, wherein the gasket is positioned such that the skin is positioned a distance away from the grill lid so as to create a gap between an exterior of the grill lid and an interior side of the skin, wherein the gasket is shaped to extend around some, but not all, of a perimeter of the grill lid.

19. The system of claim 18, wherein the gasket has a cross-section with evenly spaced semi-circular grooves so that the gasket is removable from the grill lid.

20. The system of claim 18, wherein the gap between the exterior of the grill lid and the interior side of the skin is an air gap that extends laterally and depth-wise across an entirety of the grill lid.

21. The system of claim 20, wherein the lip includes a 180 degree bend including a plurality of apertures distributed on its rear-facing surface that provide ventilation for an air gap.

* * * * *